Patented Mar. 30, 1954

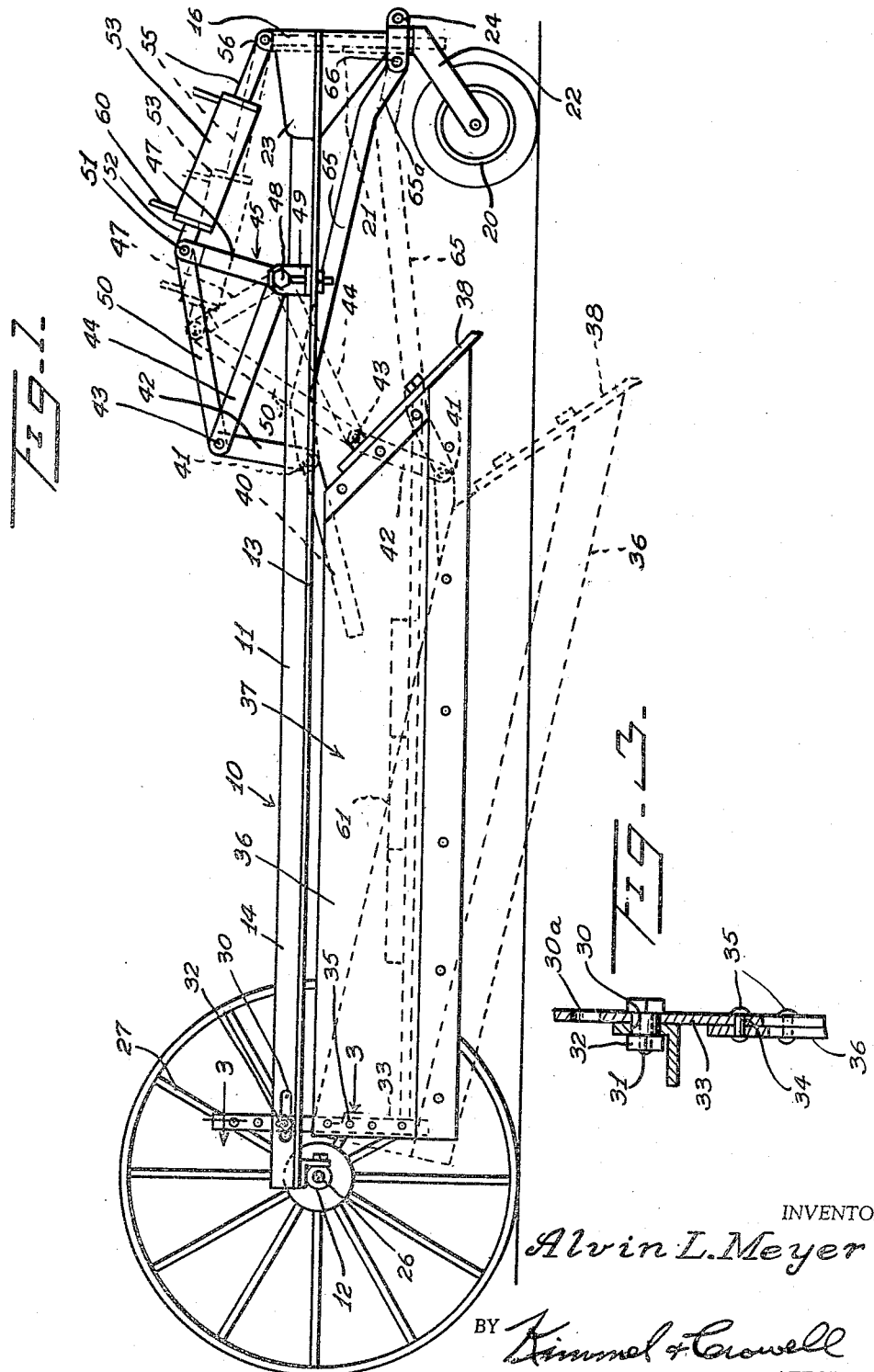

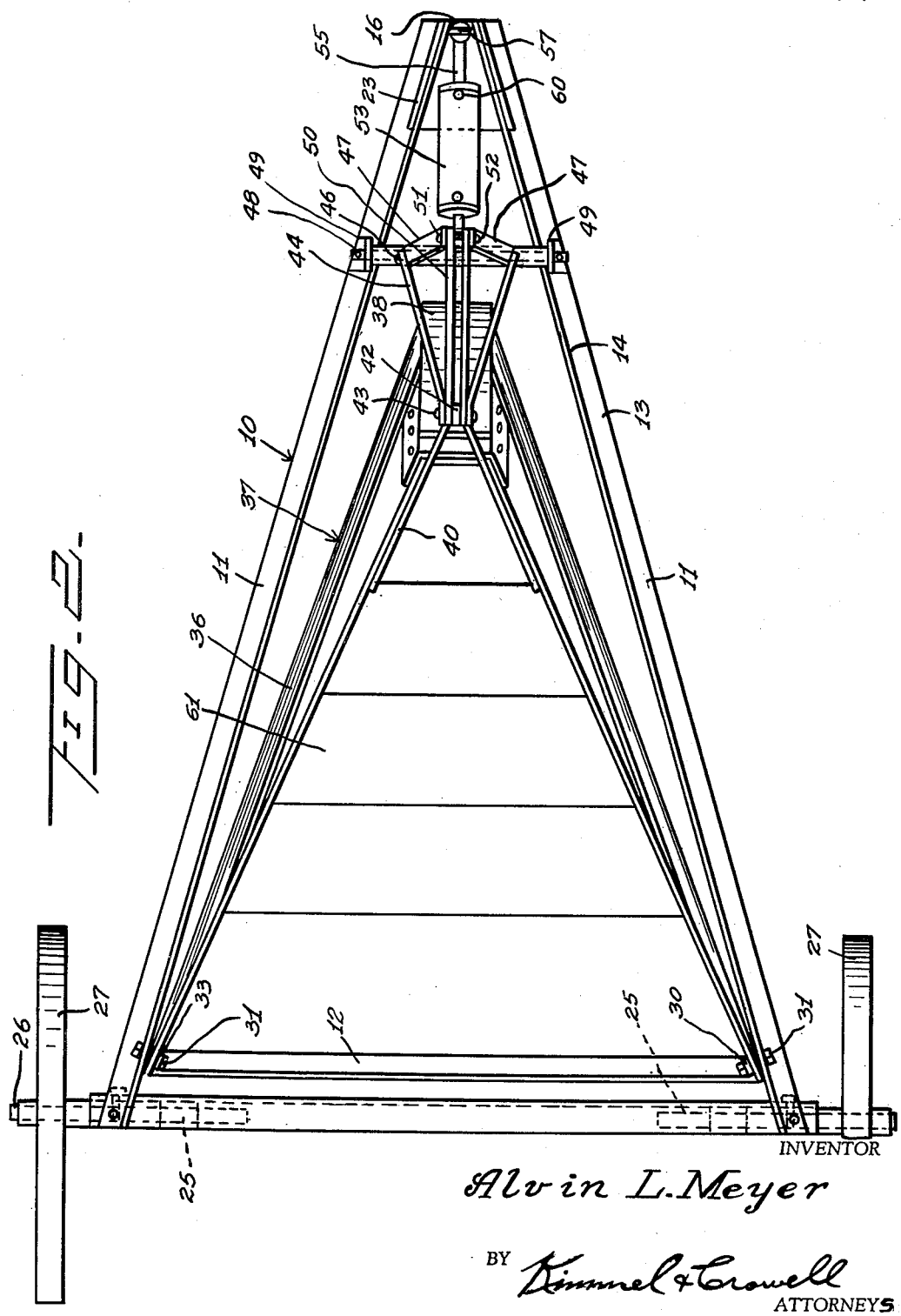

2,673,408

UNITED STATES PATENT OFFICE 2,673,408

MOLDBOARD ADJUSTMENT FOR DITCHING PLOWS

Alvin L. Meyer, Fairfield, Mont.

Application November 21, 1951, Serial No. 257,516

1 Claim. (Cl. 37—98)

This invention relates to a ditch digging device, and more particularly to a ditcher embodying a triangular-shaped plow and a mobile frame, including a pair of rear wheels which are adapted to straddle the ditch formed by the plow.

A primary object of the invention resides in the provision of an improved ditcher characterized by means whereby the plow may be raised and lowered as desired, and whereby the depth of the ditch dug by the plow may be readily varied.

An additional object of the invention resides in the provision of an improved hydraulic mechanism for raising and lowering the plow.

Still another object of the invention resides in the provision of an improved linkage connecting a hydraulic cylinder with the front end of the plow.

A further and more specific object of the invention resides in the provision of an improved plow raising and lowering device adapted to be applied to the ditcher of my previous Patent No. 2,188,892, dated January 30, 1940.

Still other objects of the invention reside in the combinations of elements, arrangements of parts, and features of construction, all as will be more fully pointed out hereinafter and shown in the accompanying drawings wherein:

Figure 1 is a side elevational view of one form of ditcher embodying the instant invention, certain parts thereof being broken away, and an alternative position of adjustment being shown in dotted lines, Figure 2 is a top plan view of the device of Figure 1, certain concealed parts thereof being indicated in dotted lines, Figure 3 is an enlarged sectional view taken substantially along the line 3—3 of Figure 1, as viewed in the direction indicated by the arrows.

Similar reference characters refer to similar parts throughout the several views of the drawings.

Referring now to the drawings in detail, there is generally indicated at 10 a mobile frame comprising a pair of forwardly convergent side bars 11 and a rear connecting bar 12. Bars 11 and 12 forming the frame are formed of angle iron and the side bars 11 having one side 13 thereof horizontal and the other side 14 vertical.

A vertically disposed front bearing 16 is positioned at the forward convergent ends of the side bars and carries a castor wheel 20 which is carried by a fork 22 secured to a shaft 21 extending into bearing 16. The bearing 16 includes a pair of side plates 23 which extend outwardly of the vertical portions 14 of bars 11, and includes a clamping bracket 24 at the lower extremity thereof. Any suitable means may be used for securing the bearing to the frame.

Rear bar 12 carries at its opposite extremities a pair of brackets 25 within which are movably mounted stub shafts or axles 26, upon which are mounted wheels 27 adapted to straddle the ditch as dug in a manner to be more fully described hereinafter.

Adjacent the rear ends of side bars 11 in the vertical portion 14 thereof, are elongated slots 30 through which extend pivot bolts 31 secured by nuts 32. The pivot bolts are carried by an elongated plate member 33 provided with two series of spaced apertures therein, through selected ones 30a of one series of which pivot bolt 31 may extend. The other series 34 is adapted selectively to receive bolts 35 or the like, for adjustably securing the rear ends of the mould boards 36 of a triangular plow generally indicated at 37. The pivots 31 permit limited swinging of the plow in a manner and for the purpose to be more fully described hereinafter.

A front end of the triangular plow 37 carries a digging point 38 of conventional design. A pair of angularly disposed plate members 40 are secured interiorly of the convergent ends of mould boards 36, extending upwardly at an angle above the upper end of the plow point 38. Pivotally secured between the extremities of member 40 by means of a pivot 41 is one end of a link 42, to the opposite ends of which are secured as by means of a pivot bolt 43, a pair of spaced arms 44 which comprise one leg of a composite bellcrank member 45. The plates 44 diverge, as best shown in Figure 2, and are fixedly secured as by means of bolts 46 to inwardly convergent members 47 comprising the other leg of bellcrank member 45. Bellcrank member 45 is pivotally secured to the convergent side bars 11, as by means of a pivot 48, to the opposite ends of which are rotatably mounted suitable journals 49 mounted on side bars 11. A pair of links 50 extend between the extremities of legs 44 and 47 and are pivotally mounted at one end on the pivot 43. The outer ends of legs 47 are pivotally connected as by means of a pivot 51 to a stud 52 which is fixedly secured to a standard hydraulic cylinder 53. The pivot 51 also serves as a pivotal connection for the other end of the links 50.

Hydraulic cylinder 53 is of conventional design and contains the standard piston (not shown), to which is connected a movable piston rod 55. The free end of piston rod 55 is pivotally connected as by means of a pivot 56 to a bracket 57 carried by the upper extremity of front bearing 16.

Suitable connections 60 provide for the admission of hydraulic fluid to cylinder 53 from any desired source and such admission may be controlled in any desired manner. An operating platform 61 is provided between the mould boards 32, upon which an operator may stand, and upon which may be mounted if desired, a source of hydraulic fluid.

A supplemental link 65 provided with an offset portion 65a to permit clearance of wheel 20 is pivotally connected at one end to the pivot 41 and at its other end by means of a pivot 66 to the lower end of front bearing 16.

From the foregoing the operation of the device should now be readily understandable. The depth of the ditch to be dug is governed, as previously stated, by the adjustment of the rear ends of the mould boards 36 relative to the spaced apertures 34 and their connection with the plate 33. When in raised position, as shown in full lines in Figure 1, the piston within cylinder 53 is held in retracted position by suitable fluid pressure, and the admission of fluid under pressure to the opposite side of the piston will cause piston 55 to move outwardly, moving cylinder 53 and thus links 47 and 50 to cause the plow to assume the position indicated in dotted lines, whereupon forward movement of the frame which may be towed by any suitable means, will cause the plow point 38 to form a ditch of the required depth and width. Conversely the admission of fluid to the opposite side of the piston will cause the same again to be retracted to raise the plow to the full line position shown in Figure 1 whereupon the device may be readily moved from place to place as desired.

It will now be seen that there is herein provided a mobile ditcher which accomplishes all the objects of this invention and there is included many advantages of great practical utility and commercial importance.

As many embodiments may be made of this inventive concept, and as many modifications may be made in the embodiments hereinbefore shown and described, it is to be understood that all matter herein is to be interpreted merely as illustrative and not in a limiting sense.

What I claim is:

A ditch digging device comprising a frame formed of a pair of forwardly convergent bars and a rear bar connecting the divergent ends of said bars together, a platform connected between said bars, a front bearing, means securing said bearing to the convergent ends of said bars, a castor wheel carried by said bearing, a pair of stub shafts, means securing said stub shafts to said rear bars, a rear wheel on each stub shaft, said pair of bars each having an elongated slot adjacent the rear end thereof, a triangularly-shaped plow, said plow having a plurality of vertically spaced apart openings adjacent the rear thereof, pivot members engaging through selected openings of said plow and through said slots, a transverse member extending across said frame, a double-sided bellcrank member pivoted to said transverse member, a link pivotally connected at one end to the forward end of said plow and pivotally connected at its other end to one leg of said bellcrank member, hydraulic means connected to the other end of said bellcrank lever to raise and lower said forward end, said hydraulic means comprising a hydraulic cylinder having a piston therein and a piston rod secured to said piston, a pivotal connection between said cylinder and said other end of said bellcrank lever, a pivoted connection between the free end of said piston rod and said front bearing, a double reinforcing link connected between the ends of the legs of said bellcrank member, and a second link pivotally connected at one end to said forward end of said plow and pivotally connected at its other end to said front bearing, said link having an offset portion to permit clearance of said castor wheel.

ALVIN L. MEYER.

References Cited in the file of this patent

UNITED STATES PATENTS

| Number | Name | Date |
|---|---|---|
| 2,188,892 | Meyer | Jan. 30, 1940 |
| 2,358,495 | Pace | Sept. 19, 1944 |
| 2,582,978 | Flynn | Jan. 22, 1952 |